(12) United States Patent
Neal et al.

(10) Patent No.: US 6,863,100 B2
(45) Date of Patent: Mar. 8, 2005

(54) COVER FOR BARBECUE GRILL AND OTHER OUTDOOR EQUIPMENT

(75) Inventors: Ryan Neal, Midland, GA (US); Hing Lor, Columbus, GA (US)

(73) Assignee: W. C. Bradley Company, Columbus, GA (US)

( * ) Notice: Subject to any disclaimer, the term of this patent is extended or adjusted under 35 U.S.C. 154(b) by 0 days.

(21) Appl. No.: 10/159,336

(22) Filed: May 31, 2002

(65) Prior Publication Data

US 2002/0179211 A1 Dec. 5, 2002

Related U.S. Application Data

(60) Provisional application No. 60/295,281, filed on Jun. 1, 2001.

(51) Int. Cl.[7] .............................................. B65D 65/02
(52) U.S. Cl. ......................... 150/165; 150/154; D6/610
(58) Field of Search ....................... 99/646 R; D6/369, D6/610; D9/387, 389, 402; 52/DIG. 14; 150/159, 165

(56) References Cited

U.S. PATENT DOCUMENTS

| | | | | |
|---|---|---|---|---|
| 2,570,533 A | * | 10/1951 | Elliott | .................... 150/166 |
| 4,404,687 A | * | 9/1983 | Hager | ........................ 383/4 X |
| D290,678 S | * | 7/1987 | Johnson et al. | ............... D7/397 |
| 4,938,522 A | * | 7/1990 | Herron et al. | ............ 296/136.1 |
| 5,737,880 A | * | 4/1998 | Hayes et al. | ............. 150/165 X |
| 6,058,658 A | * | 5/2000 | Dunn | .............................. 52/23 |
| 6,328,083 B1 | * | 12/2001 | Esterson et al. | ............. 150/154 |
| 2002/0076521 A1 | * | 6/2002 | Doppelt | |

FOREIGN PATENT DOCUMENTS

| JP | 0031207 | * 12/1970 | .................. 150/166 |
|---|---|---|---|
| JP | 31207 | * 12/1970 | .................. 150/166 |

* cited by examiner

Primary Examiner—Sue A. Weaver
(74) Attorney, Agent, or Firm—James W. Kayden; Thomas, Kayden, Horstemeyer & Risley, LLP

(57) ABSTRACT

The present invention is a pocketed cover to be used on an outdoor cooking appliance. This cover may be utilized for a barbecue grill and can be designed to appropriately fit a particular type of grill. This item may be designed for use on other outdoor equipment that also needs protection from the elements. Some examples of such equipment are smokers, lawn tools, and furniture such as chairs, umbrellas, and tables. The pocket of this cover increases the functionality of the cover, allowing for storage of items such as grill utensils. In some embodiments, the pocket can be used to store the cover itself when it is not in use. In some embodiments, the pocket is located on a front panel of the cover.

4 Claims, 2 Drawing Sheets

COVER FOR BARBECUE GRILL AND OTHER OUTDOOR EQUIPMENT

CROSS-REFERENCE TO RELATED APPLICATION

This application claims priority to now abandoned U.S. provisional application entitled, "Cover for Barbecue Grill and Other Outdoor Equipment," having Ser. No. 60/295,281, filed Jun. 1, 2001, which is entirely incorporated herein by reference.

FIELD OF THE INVENTION

The present invention generally relates to protective covers for outdoor equipment and, in particular, to covers that are placed over barbecue grills when they are not in use.

BACKGROUND OF THE INVENTION

Briefly stated, the present invention is a pocketed cover to be used on an outdoor cooking appliance. This cover may be utilized for a barbecue grill and can be designed to appropriately fit a particular type of grill. This item may be designed for use on other outdoor equipment that also needs protection from the elements. Some examples of such equipment are smokers, lawn tools, and furniture such as chairs, umbrellas, and tables. The pocket of this cover increases the functionality of the cover, allowing for storage of items such as grill utensils. In some embodiments, the pocket can be used to store the cover itself when it is not in use. In some embodiments, the pocket is located on a front panel of the cover.

Other features and advantages of the present invention will become apparent to one of reasonable skill in the art upon examination of the following drawings and detailed description. It is intended that all such additional objects, features, and advantages be included herein within the scope of the present invention, as defined by the claims.

SUMMARY OF THE INVENTION

In accordance with the present invention, a protective cover for use with outdoor equipment is provided. One embodiment of the removable cover includes a body portion, a lower flap and an upper flap. The lower flap is attached to the body portion such that a pocket having an opening is formed and the upper flap is attached to the body portion such that the upper flap covers the opening. At least one fastener is arranged and configured for connecting the upper flap to the lower flap and the pocket is arranged and configured for storing the cover when the cover is not in use.

Also provided are methods for storing a cover for use with outdoor equipment when the cover is not in use. One embodiment for storing a cover for a barbecue grill, the cover including a pocket formed by an upper flap and a lower flap having at least one fastener, includes the steps of turning the pocket inside out, placing the cover inside the now inside out pocket, and fastening the upper flap to the lower flap with the fastener.

These and other objects and advantages of the present invention will become apparent upon reading the following description, the illustrative embodiments describing the principles of the present invention with reference to the attached drawings, wherein like reference numerals have been used to refer to like parts throughout the several figures.

BRIEF DESCRIPTION OF THE DRAWINGS

The present invention will be more fully understood from the accompanying drawings of various embodiments of the invention which, however, should not be taken to limit the invention to the specific embodiments enumerated, but are for explanation and for better understanding only. Furthermore, the drawings are not necessarily to scale, emphasis instead being placed upon clearly illustrating the principles of the invention. In the drawings.

DETAILED DESCRIPTION

Figure 1:
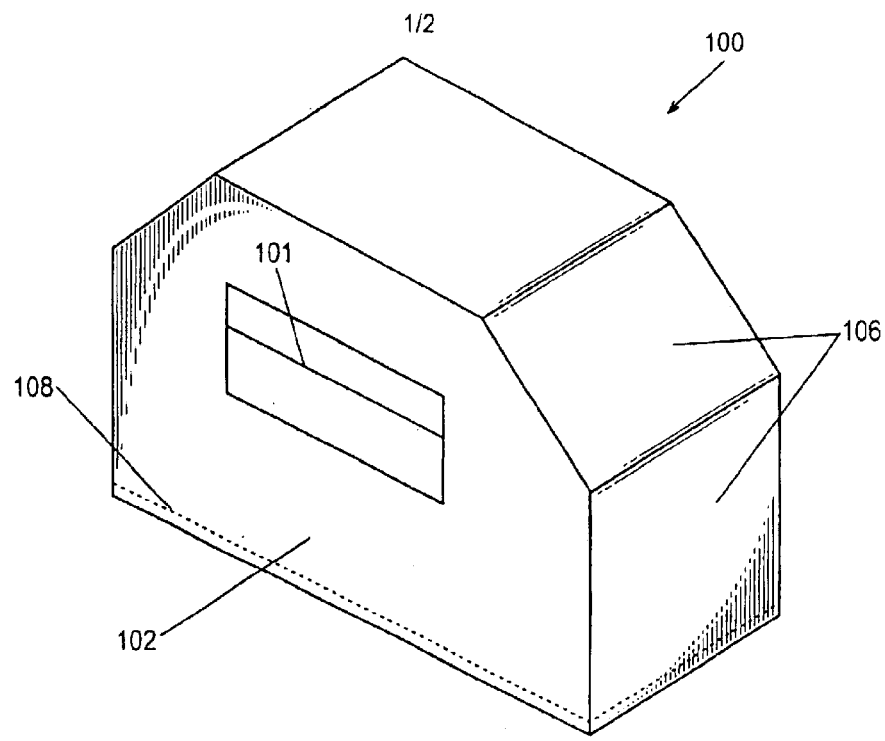
FIG. 1 is a perspective view of a preferred embodiment of the present invention.
Figure 2:
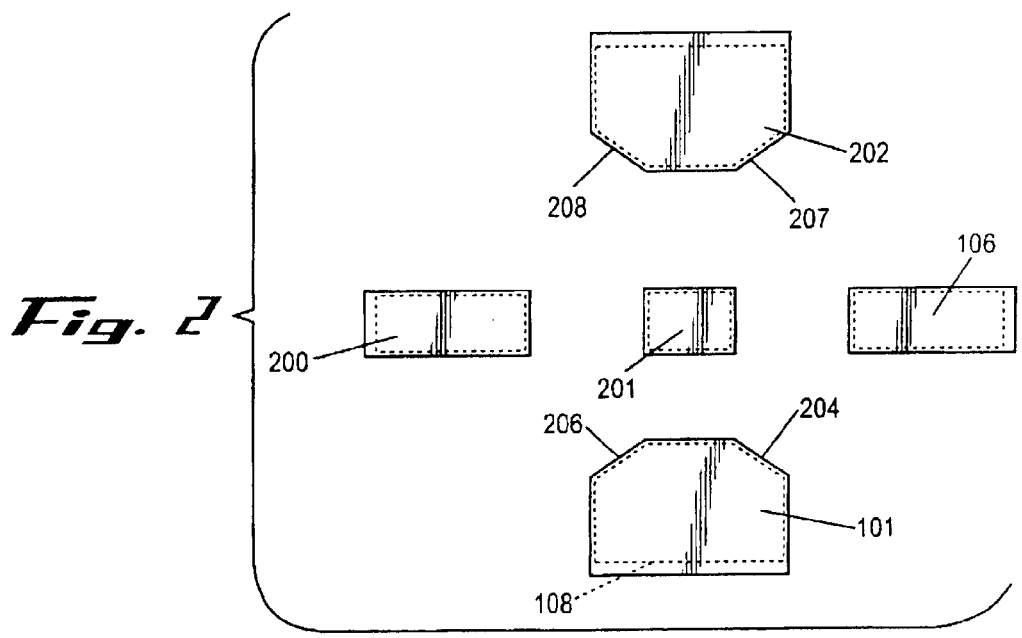
FIG. 2 is a plan view of representative panels in FIG. 1.

Reference will now be made in detail to the drawings wherein like reference numerals indicate like parts throughout the several views. As described in greater detail herein, embodiments of the pocketed cover of the present invention are designed to function as barbecue grill covers. As shown in FIGS. 1 and 2, an embodiment of the cover is configured as a hollow box-like polygon. However, the dimensions of the cover may be varied to fit grills of varying structure and size to better approximate the contour of the outdoor cooking appliance to be encased. In this embodiment, the cover is formed of multiple panels and a pocket is sewn into or otherwise formed in conjunction with one of the panels.

In FIGS. 1 and 2, cover 100 incorporates a pocket 101. In some embodiments, the pocket can be attached to a front panel 102. Two side panels, 106 and 200 are substantially identically shaped. The top panel 201 connects the two side panels, 106 and 200, with the front panel 102 and back panel 202, thereby forming the body portion of the cover 100. The bottom seam 108 is prepared wide enough to encase an elastic cord 110. This cord 110 secures the base of the cover 100 around the grill structure.

As shown in FIG 2, a preferred embodiment of the present invention incorporates two sets of matching generally rectangular panels that are composed of a PVC textile or other suitable material. The front panel 102 is rectangularly shaped with two upper truncated corners 204 and 206. Similarly, the back panel 202 is of rectangular form with two truncated corners 207 and 208 where the upper portion of the cover is formed. The right side panel 106 attaches to the top panel 201 and along the right truncated edges of the front panel 102 and the back panel 202 and extends along the length of the front panel 102 right side and the back panel 202 right side. Similarly, the left side panel 200 attaches to the top panel 201 and along the left truncated corners 206 and 208 and sides of the front panel 102 and back panel 202. The seam 108 shown in this embodiment may prevent fraying in some materials and encase an elastic cord 110.

Figure 3:
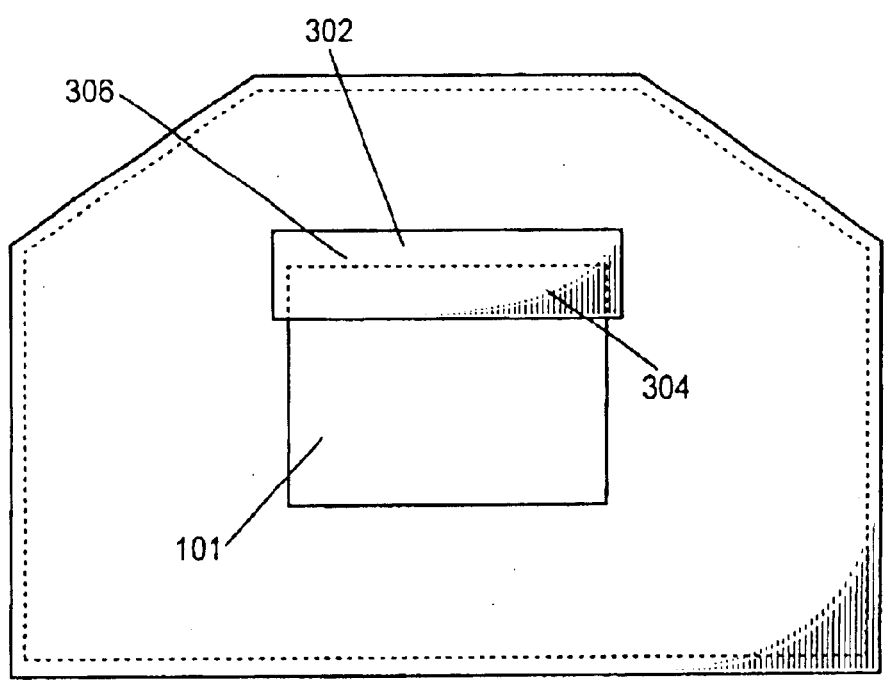
FIG. 3 is a front elevational view of the front panel of FIG. 2.

As shown in FIG. 3 and previously mentioned, the front panel can contain the pocket 101. A pouch 302 is the external opening to this pocket on the front panel and the upper flap of this pouch connects to the lower flap with fasteners 304 (such as snaps, hook and loot, fasteners such as VELCRO®, zippers, etc.) on the lower flap and fasteners 306 on the upper. These flaps can be positioned to keep rain and debris from entering the pocket.

In some embodiments, the cover can be constructed of PVC that measures 0.15 mm in thickness prior to embossing. The material can contain three to five percent dioctyl adipate. This material is preferably cold crack resistant to −20° C. All seams in the structure are normally sewn to ensure durability and possibly prevent fraying of the fabric. In some embodiments there can be an elastic cord enclosed throughout the bottom seam of the cover.

In Operation

This cover 100 has been designed to fit evenly on top of a particular type of grill and can protect it from the elements, e.g. rain. The dimensions for this particular embodiment can be chosen so the cover 100 is long enough to extend almost entirely to the ground.

A user may utilize the pocket 101 of the cover to store grilling utensils.

Once the cover 100 has been removed from the grill the user can prepare to store the cover 100 inside its pocket 101 by reaching into the pocket 101 and grabbing the lower corners. The user can then pull the corners out through the opening to turn the pocket 101 inside out. With the pocket 101 turned inside out, the user can insert the cover 100 into a pocket 101. Once the entire cover 100 has been inserted into a pocket 101, the cover 100 can be easily stored by placing the flap containing fasteners 306 over the fasteners 304 and connecting the fasteners 304, 306.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

We claim:

1. A protective cover for use with a barbecue grill, comprising:

a body portion adapted to fit substantially closely over the barbecue grill;

a lower flap and an upper flap, said lower flap being attached to the outside of said body portion such that a pocket having an opening is formed, said upper flap being attached to the outside of said body portion such that said upper flap covers said opening;

at least one fastener arranged and configured for connecting said upper flap to said lower flap, wherein said fastener further includes a first portion attached to said upper flap and a second portion connected to said lower flap; and wherein said pocket is arranged and configured and has dimensions and flexibility sufficient for storing said the entire cover when said cover is not in use on the barbecue grill.

2. The cover of claim 1, wherein said fastener is selected from the group consisting of a snap, a zipper and hook and loop fasteners.

3. The cover of claim 1, wherein said body portion further includes a bottom seam.

4. A method for storing a cover for a barbecue grill, comprising the steps of:

removing the cover from the barbecue grill, wherein the barbecue grill cover includes a pocket, formed by an upper flap and a lower flap attached to the outside of a body portion of the cover, the pocket being arranged and configured and has dimensions and flexibility sufficient for storing the entire cover, and the upper and lower flaps including fasteners;

turning the pocket inside out;

placing the cover entirely inside the now inside-out pocket; and fastening the upper flap to the lower flap with the fasteners.

* * * * *